(12) United States Patent
Shibutani

(10) Patent No.: US 11,879,776 B2
(45) Date of Patent: Jan. 23, 2024

(54) SPECTROSCOPIC DETECTOR ASSEMBLY

(71) Applicant: SHIMADZU CORPORATION, Kyoto (JP)

(72) Inventor: Ryuta Shibutani, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 8 days.

(21) Appl. No.: 17/858,646

(22) Filed: Jul. 6, 2022

(65) Prior Publication Data
US 2023/0061395 A1 Mar. 2, 2023

(30) Foreign Application Priority Data

Aug. 31, 2021 (JP) ................. 2021-141051

(51) Int. Cl.
G01J 3/02 (2006.01)
G01J 3/44 (2006.01)

(52) U.S. Cl.
CPC ........... *G01J 3/0262* (2013.01); *G01J 3/0256* (2013.01); *G01J 3/0291* (2013.01); *G01J 3/44* (2013.01)

(58) Field of Classification Search
CPC .......... G01J 3/0262; G01J 3/0256; G01J 3/44; G01J 3/0291
USPC ....................................................... 356/326
See application file for complete search history.

(56) References Cited

U.S. PATENT DOCUMENTS

| 7,403,281 | B2 * | 7/2008 | Carron | ...................... G01J 3/44 356/301 |
| 2009/0067067 | A1 | 3/2009 | Yamaya | |
| 2010/0014081 | A1 * | 1/2010 | Huening | ............... G01J 3/0289 356/326 |
| 2014/0218802 | A1 * | 8/2014 | Saito | ........................ G01J 3/51 359/578 |
| 2015/0234150 | A1 * | 8/2015 | Katsunuma | ........... G01J 3/2803 348/360 |

FOREIGN PATENT DOCUMENTS

| DE | 10 2008 026 537 A1 | 3/2009 | |
| JP | 10-090064 A | 4/1998 | |
| JP | 2018163073 A | * 10/2018 | ................ G01J 3/26 |
| KR | 20150046824 A | * 10/2013 | ............. H01L 31/16 |
| WO | WO-2018143340 A1 | * 8/2018 | ................ G01J 3/02 |

OTHER PUBLICATIONS

German Office Action dated Jun. 1, 2023, in Application No. 10 2022 002 882.4.
Communication dated Oct. 26, 2023 in German Application No. 10 2022 002 882.4.

* cited by examiner

*Primary Examiner* — Michelle M Iacoletti
*Assistant Examiner* — Noah J. Haney
(74) *Attorney, Agent, or Firm* — Sughrue Mion, PLLC

(57) ABSTRACT

A spectroscopic detector comprises a first housing, a second housing, a camera lens housed in the first housing, and an image sensor housed in the second housing. The first housing has a first through hole formed therein. The second housing has a second through hole formed therein. The second housing is attached to the first housing so as to allow for communication between an inside of the second housing and an inside of the first housing via the first through hole and the second through hole. In a state where the second housing is attached to the first housing, a periphery of the second through hole is located inside a periphery of the first through hole.

3 Claims, 3 Drawing Sheets

SPECTROSCOPIC DETECTOR ASSEMBLY

BACKGROUND OF THE INVENTION

Field of the Invention

The present disclosure relates to a spectroscopic detector.

Description of the Background Art

A micro Raman apparatus described by Japanese Patent Laying-Open No. H10-90064 has an excitation laser, a spectroscope, and a detector. In the micro Raman apparatus described by Japanese Patent Laying-Open No. H10-90064, the excitation laser irradiates a sample with laser light to cause emission of Raman-scattered light from the sample. This Raman-scattered light is dispersed by the spectroscope, and the intensity distribution of the Raman-scattered light thus dispersed is detected by the detector.

SUMMARY OF THE INVENTION

The micro Raman apparatus described by Japanese Patent Laying-Open No. H10-90064 does not have any measures against stray light detected by the detector. The present disclosure aims at solving this conventional technical problem. More specifically, the present disclosure provides a spectroscopic detector capable of inhibiting stray light detection.

A spectroscopic detector according to the present disclosure comprises a first housing, a second housing, a camera lens housed in the first housing, and an image sensor housed in the second housing. The first housing has a first through hole formed therein. The second housing has a second through hole formed therein. The second housing is attached to the first housing so as to allow for communication between an inside of the second housing and an inside of the first housing via the first through hole and the second through hole. In a state where the second housing is attached to the first housing, a periphery of the second through hole is located inside a periphery of the first through hole. The camera lens has an incidence end and an emission end in a direction of an optical axis of the camera lens, the emission end being an end opposite to the incidence end. The emission end is inserted in the first through hole. A difference between an outer diameter of the camera lens at the emission end and an inner diameter of the first through hole is smaller than a thickness of the first housing at a portion where the first through hole is formed. The image sensor faces the emission end in the direction of an optical axis of the camera lens, with a space inbetween.

In the above spectroscopic detector, the camera lens may be divided in the direction of an optical axis of the camera lens, into a fixed lens tube located closer to the incidence end and a movable lens tube located closer to the emission end. The movable lens tube may be movable relative to the fixed lens tube in the direction of an optical axis of the camera lens.

In the above spectroscopic detector, a position of the movable lens tube relative to the fixed lens tube in the direction of an optical axis of the camera lens may be changed by rotating the movable lens tube relative to the fixed lens tube about the optical axis of the camera lens.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
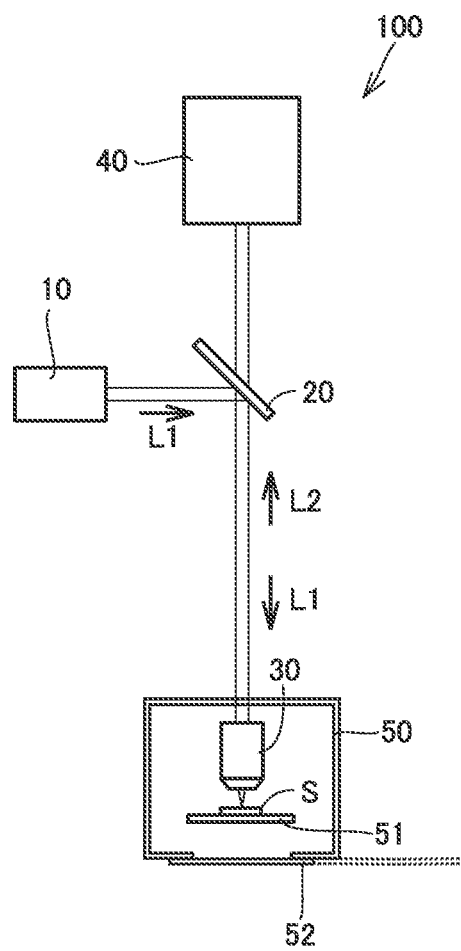
FIG. 1 is a schematic diagram of the configuration of a micro Raman apparatus 100.

Details of embodiments of the present disclosure will be hereinafter described with reference to the accompanying drawings, in which the same or corresponding portions are denoted by the same reference characters, and the description thereof will not be repeated.

(Configuration of Micro Raman Apparatus According to Embodiment)

In the following, a description will be given of the configuration of a micro Raman apparatus according to an embodiment. A micro Raman apparatus according to an embodiment is referred to as micro Raman apparatus 100.

In the following, the configuration of micro Raman apparatus 100 will be described.

FIG. 1 is a schematic diagram of the configuration of micro Raman apparatus 100. As shown in FIG. 1, micro Raman apparatus 100 further has a laser source 10, a beam splitter 20, an objective lens 30, spectroscopic detector 40, and a sample set part 50. In sample set part 50, a sample S is accommodated.

Laser source 10 emits a laser light L1. The wavelength of laser light L1 is a first wavelength. Beam splitter 20 reflects a light that has a wavelength equal to or smaller than the first wavelength, and transmits a light that has a wavelength greater than the first wavelength.

Laser light L1 emitted from laser source 10 is reflected by beam splitter 20. Laser light L1 thus reflected by beam splitter 20 is collected by objective lens 30 and directed to sample S.

When sample S is irradiated with laser light L1, sample S emits a Raman-scattered light L2. The wavelength of Raman-scattered light L2 has been shifted and is longer than the first wavelength. That is, the wavelength of Raman-scattered light L2 is a second wavelength. Raman-scattered light L2 passes through objective lens 30 and beam splitter 20 in this order. After passing through beam splitter 20, Raman-scattered light L2 enters spectroscopic detector 40. The configuration of spectroscopic detector 40 is described below.

Sample set part 50 has a stage 51 and a cover 52. Stage 51 is positioned inside sample set part 50. On stage 51, sample S is placed. Cover 52 can be opened and closed. When cover 52 is open, handling inside sample set part 50 (for example, handling sample S) is possible.

<Schematic Configuration of Spectroscopic Detector 40>

Spectroscopic detector 40 has a collimator lens 41 (not shown), a grating 42, camera lens 43, and an image sensor 44.

Raman-scattered light L2 that has entered into spectroscopic detector 40 is directed to collimator lens 41. After passing though collimator lens 41, Raman-scattered light L2 becomes a parallel light. After passing through collimator lens 41, Raman-scattered light L2 passes through grating 42 to be dispersed. After dispersed by grating 42, Raman-scattered light L2 is collected by camera lens 43 into image sensor 44. Thus, the spectrum of Raman-scattered light L2 is measured.

<Detailed Configuration of Spectroscopic Detector 40>

Figure 2:
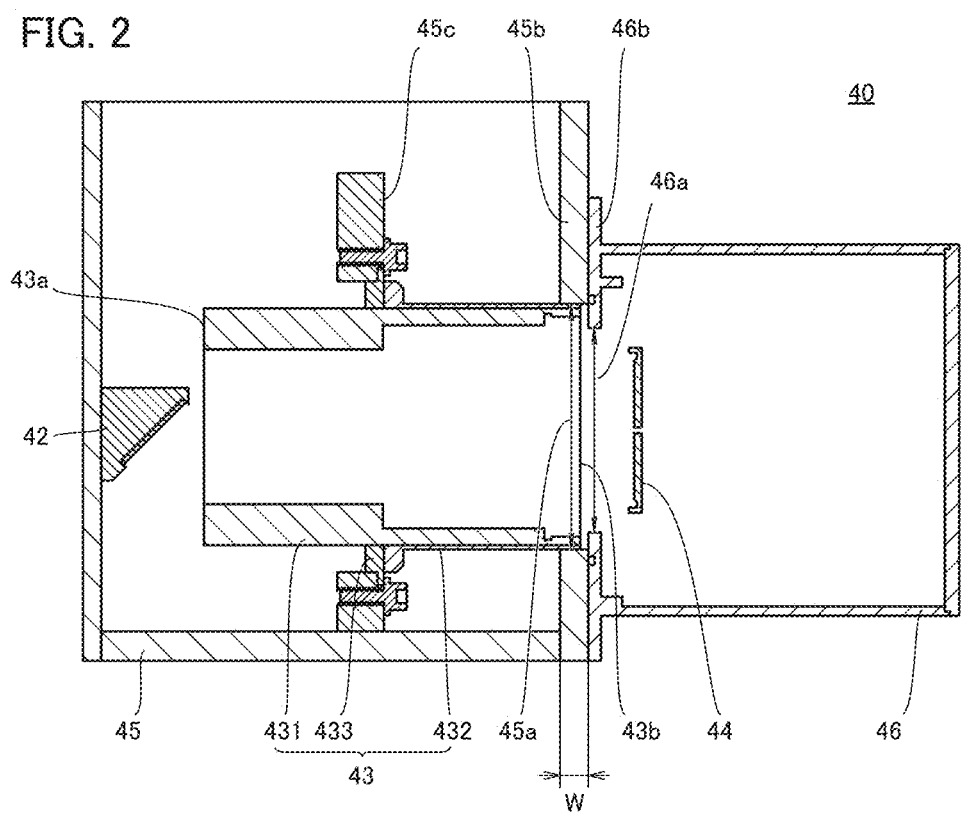
FIG. 2 is a cross-sectional view of a spectroscopic detector 40.

FIG. 2 is a cross-sectional view of spectroscopic detector 40. In FIG. 2, collimator lens 41 is omitted. As shown in FIG. 2, spectroscopic detector 40 has a first housing 45 and a second housing 46.

First housing 45 houses collimator lens 41, grating 42, and camera lens 43. Second housing 46 houses image sensor 44. Illustration is omitted but second housing 46 also houses a cooling apparatus such as a Peltier element for cooling image sensor 44, as well as an electronic circuit for controlling image sensor 44.

In an outer wall of first housing 45, a first through hole 45a is formed. In an outer wall of second housing 46, a second through hole 46a is formed. Second housing 46 is attached to first housing 45. More specifically, the outer wall of second housing 46 where second through hole 46a is formed (hereinafter, called an outer wall 46b) is attached to the outer wall of first housing 45 where first through hole 45a is formed (hereinafter, called an outer wall 45b).

First through hole 45a connects the inside of first housing 45 to the outside of first housing 45. Second through hole 46a connects the inside of second housing 46 to the outside of second housing 46. In the state where second housing 46 is attached to first housing 45, the inside of second housing 46 communicates with the inside of first housing 45 via first through hole 45a and second through hole 46a.

In the state where second housing 46 is attached to first housing 45, a periphery of second through hole 46a is located inside a periphery of first through hole 45a when viewed in a direction along the optical axis of camera lens 43. In other words, the inner diameter of second through hole 46a is smaller than the inner diameter of first through hole 45a.

Camera lens 43 has an incidence end 43a and an emission end 43b. That is, both ends of camera lens 43 in the direction of an optical axis of camera lens 43 are referred to as incidence end 43a and emission end 43b, respectively. Raman-scattered light L2 after passing through grating 42 enters from incidence end 43a into camera lens 43. Emission end 43b is an end opposite to incidence end 43a. Emission end 43b is inserted in first through hole 45a.

The thickness of outer wall 45b is defined as a thickness W. The difference between the inner diameter of first through hole 45a and the outer diameter of camera lens 43 at emission end 43b (the value obtained by subtracting the outer diameter of camera lens 43 at emission end 43b from the inner diameter of first through hole 45a) is smaller than thickness W.

Camera lens 43 is divided in the direction of an optical axis of camera lens 43, into a fixed lens tube 431 and a movable lens tube 432. Fixed lens tube 431 accommodates a plurality of lenses (not shown), and movable lens tube 432 accommodates a plurality of lenses (not shown). Movable lens tube 432 is inserted in first through hole 45a. Fixed lens tube 431 is located closer to incidence end 43a than movable lens tube 432.

Fixed lens tube 431 is fixed to an inner wall 45c which is located inside the first housing 45. Because of this, the position of fixed lens tube 431 in the direction of an optical axis of camera lens 43 is fixed. On the other hand, the position of movable lens tube 432 in the direction of an optical axis of camera lens 43 relative to fixed lens tube 431 is changeable. Moving movable lens tube 432 relative to fixed lens tube 431 in the direction of an optical axis of camera lens 43 allows for adjusting focus on image sensor 44.

Figure 3:
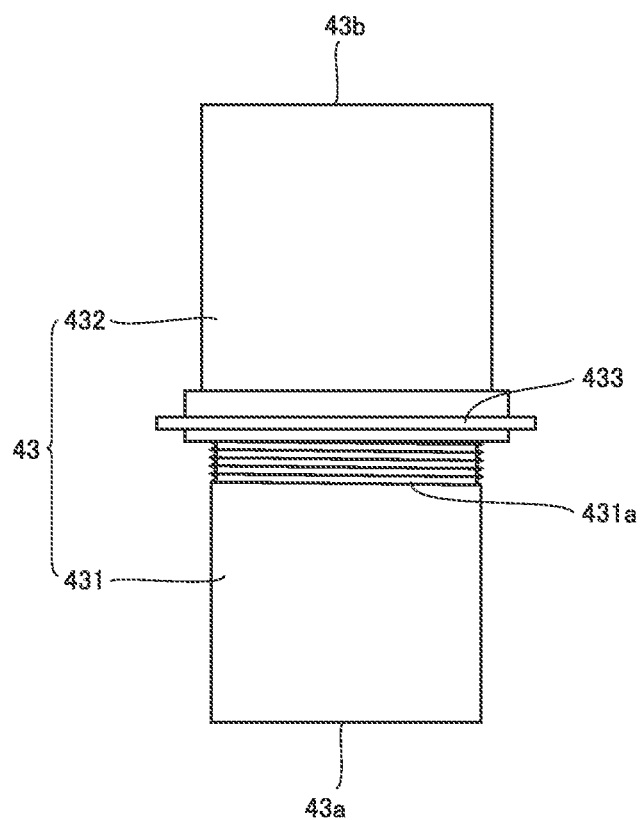
FIG. 3 is a side view of a camera lens 43.

FIG. 3 is a side view of camera lens 43. As shown in FIG. 3, an external thread 431a is formed on the outer circumference of fixed lens tube 431. Illustration is omitted but on the inner circumference of movable lens tube 432, an internal thread that threadedly engages with external thread 431a is formed. Because of this, rotating movable lens tube 432 about the optical axis of camera lens 43 changes the position of movable lens tube 432 relative to fixed lens tube 431.

Also, external thread 431a threadedly engages with a locking ring 433. Locking ring 433 is located closer to incidence end 43a than movable lens tube 432. After movable lens tube 432 is moved to a desired position, locking ring 433 is rotated about the optical axis of camera lens 43 until it comes into contact with movable lens tube 432. By this, locking force is produced between locking ring 433 and movable lens tube 432 to regulate the rotation of movable lens tube 432. In this way, locking ring 433 fixes movable lens tube 432 in a desired position.

Image sensor 44 is, for example, a CCD (Charge Coupled Device) camera. However, image sensor 44 is not limited to this. Image sensor 44 may be a CMOS (Complementary Metal Oxide Semiconductor) camera. Image sensor 44 faces emission end 43b in the direction of an optical axis of camera lens 43, with a space inbetween. By this, when movable lens tube 432 is moved relative to fixed lens tube 431 in the direction of an optical axis of camera lens 43, contact between emission end 43b and image sensor 44 is prevented.

(Effect of Micro Raman Apparatus According to Embodiment)

In the following, an effect of micro Raman apparatus 100 will be described.

In spectroscopic detector 40, focus on image sensor 44 is adjusted by moving movable lens tube 432 relative to fixed lens tube 431. Here, in order to prevent image sensor 44 from coming into contact with camera lens 43, a certain distance needs to be kept between emission end 43b and image sensor 44. The greater the distance between emission end 43b and image sensor 44 is, the easier a stray light enters into image sensor 44.

However, in spectroscopic detector 40, the difference between the inner diameter of first through hole 45a and the outer diameter of camera lens 43 at emission end 43b is smaller than thickness W. Because of this, to pass through the gap between camera lens 43 and first through hole 45a, stray light is reflected multiple times within this gap. Due to this multiple times of reflection, the stray light is attenuated.

Further, in spectroscopic detector 40, the periphery of second through hole 46a is located inside the periphery of first through hole 45a. Because of this, even if stray light has passed through the gap between camera lens 43 and first through hole 45a, it is further repeatedly reflected between emission end 43b and outer wall 46b before it can reach inside of second housing 46. By this, stray light is further attenuated.

Because spectroscopic detector 40 has such a labyrinth structure which is capable of attenuating stray light before reaching image sensor 44, micro Raman apparatus 100 having spectroscopic detector 40 is capable of inhibiting detection of stray light by image sensor 44. As a result of inhibited detection of stray light by image sensor 44, the S/N ratio of image sensor 44 is improved.

Although embodiment(s) of the present disclosure is described above, the above embodiment(s) may be modified in various ways. Also, the scope of the present invention is not limited to the above embodiment(s). The scope of the present invention is defined by claims, and encompasses all modifications and variations equivalent in meaning and scope to the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A spectroscopic detector assembly, comprising:
a first housing;
a second housing;
a camera lens housed in the first housing; and
an image sensor housed in the second housing,
the first housing having a first through hole formed therein,
the second housing having a second through hole formed therein,
the second housing being attached to the first housing so as to allow for communication between an inside of the second housing and an inside of the first housing via the first through hole and the second through hole,
in a state where the second housing is attached to the first housing, a periphery of the second through hole being located inside a periphery of the first through hole,
the camera lens having an incidence end and an emission end in a direction of an optical axis of the camera lens, the emission end being an end opposite to the incidence end,
the emission end being inserted in the first through hole,
a difference between an outer diameter of the camera lens at the emission end and an inner diameter of the first through hole being smaller than a thickness of the first housing at a portion where the first through hole is formed,
the image sensor facing the emission end in the direction of an optical axis of the camera lens, with a space inbetween.

2. The spectroscopic detector assembly according to claim 1, wherein
the camera lens is divided in the direction of an optical axis of the camera lens, into a movable lens tube inserted in the first through hole and a fixed lens tube located closer to the incidence end than the movable lens tube, and
the movable lens tube is movable relative to the fixed lens tube in the direction of an optical axis of the camera lens.

3. The spectroscopic detector assembly according to claim 2, wherein a position of the movable lens tube relative to the fixed lens tube in the direction of an optical axis of the camera lens is changeable by rotating the movable lens tube relative to the fixed lens tube about the optical axis of the camera lens.

* * * * *